US006150315A

United States Patent [19]

Komocki et al.

[11] Patent Number: 6,150,315

[45] **Date of Patent: *Nov. 21, 2000**

[54] TERPENE BASED AQUEOUS CLEANING GEL FOR SPORTING EQUIPMENT

[75] Inventors: David Stanley Komocki, Novelty; Robert Joseph Harmacek, Aurora, both of Ohio

[73] Assignee: Sports Care Products, Inc., Aurora, Ohio

[ * ] Notice: This patent is subject to a terminal disclaimer.

[21] Appl. No.: 09/455,348

[22] Filed: Dec. 6, 1999

Related U.S. Application Data

[63] Continuation of application No. 09/240,071, Jan. 29, 1999.

[51] Int. Cl.$^7$ .............................. C01D 3/18; C01D 1/70; C01D 3/30

[52] U.S. Cl. .......................... 510/190; 510/212; 510/245; 510/258; 510/433; 510/463; 510/499; 501/502

[58] Field of Search .................................... 510/190, 212, 510/245, 254, 255, 258, 420, 433, 463, 499, 501, 502

[56] References Cited

U.S. PATENT DOCUMENTS

| | | | |
|---|---|---|---|
| 3,607,769 | 9/1971 | Page . | |
| 3,873,458 | 3/1975 | Parkinson . | |
| 4,105,431 | 9/1999 | Lewis et al. | 71/67 |
| 4,171,231 | 10/1979 | Bishop et al. . | |
| 4,252,694 | 2/1981 | Lewis et al. | 252/545 |
| 4,265,899 | 5/1981 | Lewis et al. | 424/270 |
| 4,315,780 | 2/1982 | Rupp et al. . | |
| 4,482,469 | 11/1984 | Plötze . | |
| 4,806,274 | 2/1989 | Crouse et al. . | |
| 5,202,523 | 4/1993 | Grossman et al. . | |
| 5,213,624 | 5/1993 | Williams . | |
| 5,252,245 | 10/1993 | Garabedian, Jr. et al. | 252/153 |
| 5,271,773 | 12/1993 | Hamilton et al. . | |
| 5,376,387 | 12/1994 | Monticello | 424/616 |
| 5,403,587 | 4/1995 | McCue et al. | 424/195.1 |
| 5,421,899 | 6/1995 | Hamilton et al. . | |
| 5,490,947 | 2/1996 | Cloffe . | |
| 5,496,585 | 3/1996 | Hamilton et al. . | |
| 5,696,072 | 12/1997 | Nercissiantz et al. . | |
| 5,817,615 | 10/1998 | Garabedian, Jr. et al. | 510/503 |
| 5,948,741 | 9/1999 | Ochomogo et al. | 510/191 |
| 5,948,742 | 5/1999 | Chang et al. | 510/191 |

OTHER PUBLICATIONS

Hoppe's 1997 Catalog.

Popular Solvent Applications for D–Limonene, Revision date Mar. 18, 1993 by Florida Chemical Co.

Suggested Formulas Incorporating . . . D–Limonene, Mar. 1990 by Specialty Chemical Division.

D–Limonene All–Purpose Cleaner by Mike Robertson and Rohm and Haas Company.

D–Limonene Based Cleaner Formulations by Exxon Chemical Company.

Chemax, Inc. Product Data Sheet for "All Purpose D–Limonene Cleaner" (Jul. 1991).

Ballistol Law Enforcement and Military Uses brochure by ACA Dist. Corp.

MP$^{RO}$7 Gun Cleaner brochure by Windfalls Distributing, Inc.

"MP$^{RO}$7 Gun Cleaning Products, The Ultimate Gun Cleaning Technology" phamplet by Windfalls Distributing, Inc.

"Hoppe's and Hoppe's Protecto Case" dealer price list by Penguin Industries Inc.

*Primary Examiner*—Yogendra Gupta
*Assistant Examiner*—Christine E. Ingersoll
*Attorney, Agent, or Firm*—Vickers, Daniels & Young

[57] ABSTRACT

A viscous firearm gel cleaner that includes an organic cleaning agent such as terpene, terpene derivatives, terpenoids, terpenoid derivatives, turpentine and/or turpentine derivatives. The organic solvent includes substantially no petroleum distillates. The cleaner includes non-ionic and ionic surfactants to enhance the usability and effectiveness of the cleaner. The cleaner can also include an amine cleaning agent, a scent agent, a rust and/or corrosion inhibitor, a thickener, and/or a biocide. The cleaner removes grease, oil, carbon, plastic wad fouling and metal residues that can foul firearms. The cleaner is a water soluble, non-flammable, biodegradable cleaner. The cleaner is especially useful for cleaning outdoor sporting equipment such as firearms.

67 Claims, No Drawings

TERPENE BASED AQUEOUS CLEANING GEL FOR SPORTING EQUIPMENT

This patent application is a continuation, of application Ser. No. 09/240,071 filed on Jan. 29, 1999, and incorporated herein by reference.

The present invention relates to cleaning compounds developed for use with outdoor sporting equipment. More particularly, the invention relates to a cleaning agent for cleaning interior portions of firearms, such as chambers and barrels, and exterior portions, such as the face of the cylinder firearm barrels or gun bores. The cleaning agent preferably removes residues deposited as a result of firing, such as carbon and metal deposits on the barrel, the chamber, and the cylinder face of firearms.

BACKGROUND OF THE INVENTION

When firearms, such as pistols, rifles and the like, are fired, small amounts of residues deposit within the chambers and barrels, as well as on adjacent exterior surfaces, thereof. These residues include grease and other lubricants from bullets or cartridges, carbon from the burning of the gunpowder propellant, and metallic deposits from the bullet. Over a period of time, these deposits build up and adversely affect the efficiency and utility of the firearm. As a result, the firearm must be constantly cleaned and maintained to achieve the maximum efficiency, utility and life of the firearm.

The standard method of cleaning a firearm includes the use of fabric cloth or swab that is attached to a cleaning rod. Large amounts of lead buildup on the firearm typically requires some scraping with a sharp instrument to take off the bulk of the lead, prior to using the cleaning rod. Care is to be taken when using a sharp instrument so as not to mar the finish of the firearm. The cloth or swab is used to absorb cleaning solution after being dipped into a cleaning solution. The current cleaning solutions for cleaning residues from a firearm include strong solvents, and the like, which break down the residues. The cleaning rod is run back and forth through the barrel (bore) and the cylinders. The cloth or swab is frequently replaced so as not to transfer residues from one part of the firearm to another. A brass brush is typically connect to the cleaning rod and inserted vigorously through the barrel and the cylinders to loosen and clean the metal and/or carbon residue on the components of the firearm. After using the brush, clean cloths or swabs are subsequently run through the barrel and the cylinders to remove any remaining cleaning solution and/or residue in the firearm. A protective oil is typically applied to the firearm components after cleaning. This multi-step cleaning method is time-consuming and messy and there is a tendency among firearms users to perform this task somewhat less frequently than would be desirable. Typically, an hour spent on cleaning the firearm will not leave it completely free of carbon and/or metal residues.

The cleaners that are used to remove deposits on the firearms include compositions of ammonia solutions; nitro solvents; organic solvents of various types (predominantly petroleum distillates); alkanolamides and diethanolamines; aluminum oxide, petroleum and citrus oils and ammonium chloride; and peroxide oxidizing agents, a liquid detergent surfactant, a scenting agent and an alcohol.

Although these cleaners satisfactorily remove many of the residues on firearms, the cleaners have one or more disadvantages such as having a deleterious effect on the metal parts of the firearm (i.e. causing etching, causing brittleness of metal) which can adversely effect the accuracy of the firearm and/or the firearm becomes unsafe or unreliable to use. In addition, many of the cleaners rapidly decompose and lose strength over time if not properly stored. Many of the cleaners include highly volatile components which are flammable and/or have relatively low flash points, thus requiring special care during use. Many of the cleaning solvents are highly toxic and required special care, ventilated environments and use of gloves and/or other handling equipment during the cleaning of the firearm. Several of the cleaners are non-biodegradable and/or produce hazardous waste. Most of these cleaners have or produce an unpleasant or noxious odor. Several of the cleaners result in skin and/or eye irritation during use. Many of the cleaners include abrasives and/or require the use of abrasives during the cleaning process, such abrasives can scratch and/or damage the firearm. As a result, the use of these cleaners can be inconvenient to use, store and/or handle, and are very time consuming to use. Furthermore, many of these cleaners are low viscosity solutions which entails messy handling and cleaning. These low viscosity cleaners migrate once applied to the firearm, thus creating imprecise application and inconvenient and messy handling. In addition, due to the tendency of these cleaners to migrate, the cleaner often comes in contact with areas of a part which should be kept free of the cleaner which can result in damage to the firearm. The migration of the cleaner to the stock of the firearm can cause flashing or ignition of the cleaner when the firearm is used. The migration of the cleaner also results in messy application and time consuming cleaning.

In U.S. Pat. Nos. 5,490,947; 4,806,274 and 4,315,780, firearm cleaners are disclosed which include a scent to mask the odor of the cleaning compounds. Although the cleaners address one of the problems of traditional cleaners, the problems of inconvenient handling, volatility, toxicity, use of abrasives, skin irritation, non-biodegradability, production of hazardous waste and migration of the cleaner still remain. In U.S. Pat. Nos. 4,482,469 and 3,607,769, firearm cleaners are disclosed which have a higher viscosity than traditional cleaners. Although the cleaners minimize migration problems, the problems of inconvenient handling, odor, volatility, toxicity, use of abrasives, skin irritation, non-biodegradability and/or production of hazardous waste still remain. These five prior art references are incorporated herein by reference as background information.

In view of the existing cleaners, there is a need for a cleaner that can be used to clean a variety of outdoor sporting equipment, and is especially designed to remove residues of carbon and other gunpowder deposits, plastic, grease, lubricants, lead and other metallic deposits from firearms, is easy and convenient to use, is easy to store, has great versatility of use, is essentially non-migratory after application, is unscented or includes a masking scent, is essentially non-volatile, is not highly toxic, reduces skin and eye irritation, is biodegradable, produces essentially no hazardous waste, and minimizes the need for abrasives.

SUMMARY OF THE INVENTION

The present invention relates to an improved cleaner for sports equipment, and more particularly, to an improved cleaner for firearms which easily removes various types of residues that have deposited on the components of the firearm during use. As can be appreciated, the cleaner has broader applications and can be used for other applications such as cleaning any type of weapon, and other equipment that accumulates metal and/or gunpowder residues. The cleaner is formulated to remove a wide variety of unwanted carbon metal residues. The metal residues include, but are not limited to, copper, lead, tombac, and zinc. The cleaner is also formulated to remove unwanted oil and grease on a component. In firearm applications, the cleaner is formulated to remove residues of plastic, carbon and black powder. In one preferred embodiment, the cleaner is formulated to minimize the migration of the cleaner to undesired regions on the equipment being cleaned. In another preferred embodiment, the cleaner is water soluble. The water solubility of the cleaner allows for easy clean-up and disposal of the cleaner after use. In a further preferred embodiment, the cleaner is biodegradable or semi-biodegradable. The biodegradability of the cleaner simplifies the clean-up and disposal of the cleaner and makes the cleaner more environmentally friendly. In yet another preferred embodiment, the cleaner is essentially non-flammable. The non-flammability of the cleaner provides for safer applications and use of the cleaner. In still another preferred embodiment, the cleaner is generally non-toxic. The low toxicity of the cleaner provides for safer use and application and makes the cleaner more environmentally friendly. In still yet another preferred embodiment, the cleaner does not include abrasives or polishing agents. Abrasives and polishing agent can scratch and damage a component during the cleaning process. The elimination of such abrasives and polishing agents reduced scratching and other damage to a component such as the barrel of a firearm. In a further preferred embodiment, the cleaner does not include petroleum distillates. Petroleum distillates increase the flammability and volatility of cleaners. The reduction or elimination of petroleum distillates from the cleaner reduces the volatility and flammability of the cleaner, reduces the incidents of flashing and ignition of the cleaner during use of sporting goods, and can increase the flashing point temperature ofthe cleaner. In still another preferred embodiment, the cleaner does not adversely affect the gun blueing during cleaning.

In accordance with the invention, there is provided a sports cleaner that includes an organic cleaning agent contained in a viscous solution. The organic cleaning agent includes a non-petroleum distillate compound. One such cleaning agent is terpene, terpene derivatives, terpenoid, terpenoid derivatives, and combinations thereof. Turpentine and turpentine derivatives can also be used. The term "terpene/terpenoid" is defined as including terpene, terpene derivatives, terpenoid, terpenoid derivatives, turpentine, turpentine derivatives, and combinations thereof. The terpene/terpenoid also softens plastic residues thereby facilitating in their removal. The terpene/terpenoid functions as a solvent to remove grease, oil, and various organic residues. The terpene/terpenoid are excellent solvents and typically have a low toxicity. Many terpene/terpenoid that are extracted from plants have a pleasant aroma. Many terpene/terpenoid are both water and oil soluble thereby making such terpene/terpenoid versatile for use in a wide variety of formulations. The terpene/terpenoid can also form clear products in water by maintaining the particle size in the emulsion to less than about 0.01 micron. In one preferred embodiment, the organic cleaning agent includes synthetic organic compounds and/or organic compounds derived from vegetation and preferably from plants. In another preferred embodiment, the organic cleaning agent includes substantially no petroleum distillates. In one specific embodiment, the cleaner contains less than about 5% petroleum distillates, and preferably less than about 2% petroleum distillates, and more preferably less than about 0.5% petroleum distillates. In still another preferred embodiment, the cleaner includes at least about 1% terpene/terpenoid, preferably at least about 2, more preferably 2–25%, and still more preferably 2–8%. In yet another preferred embodiment, the terpene/terpenoid includes D-LIMONENE. In still yet another preferred embodiment, the terpene/terpenoid includes TERPENE EX. The cleaner is formulated to have a sufficient viscosity to inhibit or prevent the cleaner from migrating to regions other than which the cleaner is directly applied. In firearm applications, the viscous cleaner clings to the surface of the firearm barrel, thus inhibiting or preventing the cleaner from running on the surface of the barrels and fouling other components of the firearm. Preferably the cleaner is a gel or viscous foam or liquid that adheres to a component surface. The viscous cleaner is preferably contained in a container such as a bottle or tube and is extracted by squeezing or pumping the cleaner from the container. The cleaner may also be extracted by spraying the cleaner from an aerosol or non-aerosol container. The cleaner can be directly applied to a component to be cleaned, or to a cloth or swab which is then applied to the component to be cleaned. For the cleaning of firearms, the cleaner is preferably applied to a cleaning swab that is attached to a cleaning rod, or the cleaner is applied to the bristles of a cleaning brush.

In accordance with another aspect of the present invention, the desired viscosity of the cleaner is at least partially obtained by including a surfactant in the cleaner. The viscosity of the cleaner is at least about 200 cp, preferably at least about 500 cp, more preferably about 2000–18000 cp, and even more preferably about 3000–9500 cp. The viscosity of the cleaner in liquid form or gel form is at least about 1000 cp, preferably about 1500–10000 cp, and more preferably about 2000–9000 cp. The viscosity of the cleaner in aerosol form is at least about 200 cp, preferably about 500–8000 cp, and more preferably about 2000–6000 cp. The viscosity of the cleaner is selected to reduce the tendency of the cleaner to significantly migrate from the point of application. Preferably the viscosity of the cleaner is adjusted so as to significantly inhibit or prevent the migration of the cleaner from the point of application. The total amount of surfactant included in the cleaner is at least about 2%, preferably at least about 5%, more preferably about 5–60%, and even more preferably about 5–40%. The surfactant can be an ionic or non-ionic surfactant. Preferably, the surfactant is a combination of ionic (i.e. cationic and/or anionic) and non-ionic surfactants. The surfactant preferably is selected to provide additional functions and features to the cleaner. In one preferred embodiment, the surfactant assists in emulsifying the terpenes/terpenoids in the cleaner. In one specific embodiment, the surfactant assists in forming a micro emulsion with the terpenes/terpenoids in the cleaner. In another preferred embodiment, the surfactant assists in forming a generally homogeneous cleaner and assists in stabilizing the cleaner components. The surfactant at least partially functions as dispersion agent to stabilize the components in the cleaner. In yet another preferred embodiment, the surfactant acts as a lubricant, an anti-oxidant, and/or a corrosion-inhibitor. In still another preferred embodiment, the surfactant includes a non-ionic-surfactant. In yet another preferred embodiment, the surfactant is the combination of an ionic and non-ionic surfactant. In still yet another preferred embodiment, the propellant for the aerosol is a water soluble compound. One particular compound is, but not limited to, dimethyl ether. In a further preferred embodiment, the surfactant assists in emulsifying dirt, grease, oil, gun powder, rust, corrosion and/or grime. The emulsifying action of the surfactant assists in cleaning the surface of a component. In still a further preferred embodiment, the surfactant assists in wetting the surface of a component thereby assisting in allowing the other components of the cleaner to perform their function (i.e. cleaning) on the surface of the component. In another preferred embodiment, the surfactant functions as a clarifying agent to assisting is forming a clear or semi-clear cleaner. In one specific embodiment, a non-ionic surfactant is included in the cleaner to emulsify dirt grease, oil, and grime and to act as a wetting agent to assist in the removal of metal residues.

In accordance with yet another aspect of the present invention, the cleaner includes a non-ionic surfactant. The non-ionic surfactant assists in increasing the viscosity of the cleaner. Preferably, the amount of non-ionic surfactant in the cleaner is at least about 1%, and more preferably at least about 2%, and even more preferably about 2–30%. One preferred non-ionic surfactant is ethoxyl alcohol and/or ester surfactant. One particular non-ionic surfactant is, but not limited to, ethoxylated alkyl phenol, ethoxylated alcohols and/or glycol esters. Specific ionic surfactants that can be used include TRITON X-102, TRITON X-45, SURFONIC QP-70, and/or SURFONIC QP-50. In another preferred embodiment, the non-ionic surfactant also preferably includes a glycol such as, but not limited to, polyethylene glycol.

In accordance with still another aspect of the present invention, an ionic/non-ionic surfactant is included in the cleaner to enable the formation of clear or semi-clear micro emulsions of the terpenes/terpenoids in the cleaner. The ionic/non-ionic surfactant also improves the wetting, detergency and rinsing properties of the cleaner. Preferably, the amount of ionic/non-ionic surfactant in the cleaner is at least about 1%, more preferably at least about 2%, and even more preferably about 2–15%. Generally, the ratio of ionic/non-ionic surfactant to terpenes/terpenoids is about 0.5–2:1, and more preferably about 1:1. Preferred ionic/non-ionic surfactants which can be used in the cleaner are, but are not limited to, alkanolamides and/or imidazolines.

In accordance with still another aspect of the present invention, the cleaner includes a buffered system to reduce the corrosive properties of the cleaner components. The pH of the cleaner is maintained to be no more than slightly acidic. The cleaner is formulated to be preferably an alkaline solution. A too acidic pH can cause etching or corrosion on a metal surface. An acidic pH can also cause discoloring of metals and the removal of the blueing on the firearm. The terpene/terpenoid are corrosive compounds in acidic environments. The inclusion of a buffered system to control the pH of the cleaner to reduce the acidity of the cleaner inhibits or prevents corrosive compounds, such as terpene/terpenoid, from adversely affecting a metal surface. The pH of the cleaner is not allowed to be too alkaline since high alkalinity can also result in etching and/or corrosion of a metal surface. Preferably the pH of the cleaner is below 13. The buffered system preferably includes one or more surfactants and/or amides to control the pH of the cleaner. Other pH modifies can include sodium benzoate. In one preferred embodiment, the pH of the cleaner is no more than about 6.2 pH acidic. In another preferred embodiment, the pH of the cleaner is about 7–12.5, preferably about 8–12, and more preferably about 8.3–11.

In accordance with yet another aspect of the present invention, the cleaner includes a rust and/or corrosion inhibitor. One or more components of the cleaner can cause a metal component to rust or corrode during and/or after the cleaning process. Specifically, in water based cleaners, water can cause some metals to rust and/or corrode. The amount of rust and/or corrosion inhibitor in the cleaner is at least about 0.1%, preferably at least about 0.4%, more preferably about 0.5–20%, and even more preferably about 0.5–10%. In one preferred embodiment, the cleaner includes a surfactant that assists in inhibiting or preventing flash rusting or corrosion. Preferably, the surfactant forms a thin protective layer on the surface of the component to assist in inhibiting or preventing flash rusting or corrosion. In one specific embodiment, the rusting and corrosion inhibiting surfactant is a ester containing surfactant such as, but not limited to, a phosphate ester surfactant. Specific corrosion inhibitors that can be used include DEXTROL ARP-1 AND/OR SUPER V8.

In accordance with yet another aspect of the present invention, the cleaner includes one or more thickeners to increase the viscosity of the cleaner. The thickeners preferably includes, but are not limited to, one or more thickening compounds such as celluloses, alginates, acrylics, xanthan gums, gums, clays, silicas, polyacrylates, polyvinyl alcohol, starch, casein and/or stearates. One or more thickeners can be used in the cleaner. Many thickeners are pH dependant thus requiring the amount and type of the thicker to be determined based upon the pH of the cleaner. The cleaner includes at least about 0.1% thickener, preferably at least about 0.4% thickener, more preferably about 0.5–10% thickener, and even more preferably about 0.5–5% thickener. In one preferred embodiment, the thickener is a non-flammable thickener. In another preferred embodiment, the thickener is biodegradable. In yet another preferred embodiment, the thickener is water soluble. In still another preferred embodiment, the thickener is non-abrasive. In one specific embodiment, the thickener is a water soluble modified acrylic. The modified acrylic preferably exhibits it thickening properties in an alkaline environment. Specific thickeners that can be used include ULTAREZ and/or CARBOPOL.

In accordance with another aspect of the present invention, the cleaner has little or no petroleum solvents. The elimination of petroleum solvents reduces the tendency of the cleaner to flash or ignite when exposed to high temperatures. The elimination of petroleum solvents also reduces the volatile content of the cleaner. Preferably the cleaner causes little or no irritation to the eyes during the cleaning process. The reduction or elimination of volatile compounds reduces storage and ventilation problems commonly associated with traditional cleaners. The reduction or elimination of volatile components in the cleaner also reduces the incidence of flashing when the cleaner is exposed to high temperature environments. The formation of the cleaner into a viscous compound further reduces the volatility of the components in the cleaner by inhibiting the evaporation of the cleaner components.

In accordance with still another aspect of the present invention, the cleaner is a water based mixture. Preferably, water is the primary component of the cleaner. The cleaner includes at least about 30% water, preferably about 50–95% water, and even more preferably about 55–80% water. The water functions are the carrier of the cleaner components. The water also has wetting characteristics to enable the other cleaner components to perform their respective functions. The water also functions as a cleaner and assists in removing residues such as, but not limited to, gun powder, paint, dirt and grime. The water also assist in making the cleaner biodegradable, less flammable and more environmentally friendly.

In accordance with a further aspect of the present invention, the cleaner can include one or more optional additives to add certain advantageous features to the cleaner. The cleaner can include, but is not limited to, dyes, anti-oxidants, corrosion inhibitors, lubricants, detergents, diluents. In one preferred embodiment, the cleaner includes a corrosion inhibitor to inhibit or prevent the formation of rust or corrosion during and/or after the cleaning process. Preferably, the amount of corrosion inhibitor in the cleaner is at least about 0.01%, more preferably at least about 0.1%, even more preferably about 0.1–8%, and still even more preferably about 0.3–2%. In one specific embodiment, the corrosion inhibitor includes, but is not limited to, sodium benzoate. In another preferred embodiment, biocide is added to the cleaner. Preferably, the biocide inhibits or prevents micro-organisms from growing in the cleaner and fouling the components of the cleaner. Preferably, the amount of biocide in the cleaner is at least about 0.01%, more preferably at least about 0.05%, even more preferably about 0.05–8%, and still even more preferably about 0.05–1%. In one specific embodiment, the biocide includes, but is not limited to, sodium benzoate, and/or KATHON. In still another preferred embodiment, the cleaner includes additional cleaning agent such as, but not limited to, formamides, aliphatic oxyethylated alcohols, alkali and alkaline earth salts of ethylenediaminetetraacetic acid of potassium oleate, and/or salts of napthenic acid. In yet another preferred embodiment, the cleaner includes a lubricant such as, but not limited to, glycerin and/or glycol. The lubricant assists in the cleaning operation by easing the movement of a swab and/or brush over the component to be cleaned. Glycerin and/or glycol also inhibits the drying out of the cleaner during use and storage. The use of glycerin and/or glycol also lowers the freezing point of the cleaner thereby rendering the cleaner suitable for use under extreme outdoor weather conditions. In still yet another embodiment, the cleaner can include a polishing powder. The polishing powder assists in removing residues during cleaning. However, the polishing agent can cause scratching during cleaning. Preferably, the cleaner contains little or no polishing agent or other type of abrasive. In a further preferred embodiment, the cleaner includes coloring agent. The coloring agents may be FDA approved food colorings or other colorants which do not react with the other ingredients in the cleaner. The use of colors can be used to signify a particular strength or type of cleaner. The coloring agent may also function as an indicator to identify residues during the cleaning process. In still a further preferred embodiment, the cleaner includes an anti-oxidant to inhibit or prevent the reduction of the components in the cleaner. One preferred anti-oxidant includes morpholine.

In accordance with still yet another aspect of the present invention, the cleaner includes an amine and/or amide to assist in the removal of certain residues. The amide and/or amine may also be formulated to inhibit or prevent rusting or corrosion during and/or after the cleaning of a metal component. The amine and/or amide also adjusts the pH of the cleaner to be more alkaline. The pH adjustment of the cleaner assists in inhibiting or preventing the growth of microbes, and assists in activating the thickeners in the cleaners. In one preferred embodiment, the amine and/or amide is formulated to assist in the removal of metal residues such as, but not limited to, copper. The use of amines and/or amides, in combination with terpene/terpenoid, effectively removes all types of metal residues. The amount of amine and/or amide in the cleaner is at least about 0.1%, preferably at least about 0.4%, and more preferably about 0.4–15%. In one specific embodiment, the amide and/or amine includes, but is not limited to, amino alcohols such as 2-amino-2-methyl-1-propanol, alkanolamines such as triethonolamide and/or diethanolamine, and/or borates of amines. One preferred ammonia amine and/or amide includes AMP-95, morpholine, and/or WR-500.

In accordance with still yet another aspect of the present invention, the cleaner includes ammonia, ammonia compounds, peroxide and/or peroxide compounds to assist in the removal of certain residues. The ammonia, amionia compounds, peroxide and/or peroxide compounds also adjusts the pH of the cleaner to be more alkaline. The pH adjustment of the cleaner assists in inhibiting or prevent the growth of microbes, and assists in activating the thickeners in the cleaners. In one preferred embodiment, the ammonia, ammonia compounds, peroxide and/or peroxide compounds is formulated to assist in the removal of metal residues such as, but not limited to, copper. The use of ammonia, ammonia compounds, peroxide and/or peroxide compounds, in combination with terpene/terpenoid, effectively removes all types of metal residues. The amount of ammonia, ammonia compounds, peroxide and/or peroxide compounds in the cleaner is at least about 0.1%, more preferably at least about 0.4%, and even more preferably about 0.4–10%. Preferably, an amine and/or amide is added to the cleaner when ammonia, ammonia compounds, peroxide and/or peroxide compounds is included in the cleaner.

In accordance with yet another aspect of the present invention, the cleaner includes a scent agent to mask the natural odor of the components of the cleaner. The scent agent may be any compound which partially or completely masks the odor of the cleaning agents and surfactants in the cleaner with little or no reaction with such components. The scent agent can be derived from a natural source or be artificially manufactured. The particular scent agent used is generally derived from the oil of a tree, plant, fruit or vegetable. Scents that can be used, but are not limited to, include coconut, lemon or other citrus scents, earth, acorn, apple, pine, cedar, and corn. The use of scent agents in the cleaner is particularly applicable for firearm cleaners. The use of a scented cleaner on a firearm will assist in masking foreign scents from the wildlife. The scent agent is preferably selected to assist inhibiting or preventing rust or corrosion on the metal surfaces of a component. Perfumes or other odor masking ingredients may also be used. The amount of scent agent in the cleaner is at least about 0.001%, preferably at least about 0.005%, and more preferably about 0.005–1%. The use of a scent agent may be reduced or eliminated when using certain scented terpene/terpenoid in the cleaner due to the natural citrus odor of such terpene/terpenoid.

The principal object of the present invention to provide a cleaner that effectively removes residues.

It is another object of the present invention to provide a cleaner that substantially completely removes unwanted residues in a single application without undue effort.

It is yet another object of the present invention to provide a cleaner that is nonirritating to the user.

It is a further object of the present invention to provide a cleaner that is substantially odorless or includes a masking scent.

It is another object of the present invention to provide a cleaner that easily and quickly removes residues.

It is still another object of the present invention to provide a cleaner which removes residues and which overcomes the disadvantages of prior cleaners.

It is yet another object of the present invention to provide a cleaner which is inexpensive and which is formulated from readily available ingredients.

It is a still further object of the present invention to provide a cleaner which may be used in a conventional manner without the need of specialized equipment.

It is a further object of the present invention is to provide a viscous cleaner that resists migration during and after application.

Another object of the present invention is to provide a cleaner that is convenient and easy to handle.

Yet another object of the present invention is to provide a cleaner that is water soluble.

Still yet another object of the present invention is to provide a cleaner that is biodegradable.

A further object of the present invention is to provide a cleaner that is has little or no abrasives.

Yet a further object of the present invention is to provide a cleaner that is essentially non-corrosive to a variety of metals.

Still another object of the present invention is to provide a cleaner that includes a buffered system.

Still yet another object of the present invention is to provide an alkaline cleaner.

Yet another object of the present invention is to provide a cleaner that does not affect the blueing of a firearm.

Another object of the present invention is to provide a cleaner that is essentially non-flammable.

A further object of the present invention is to provide a cleaner that is a gel.

Still another object of the present invention is to provide a cleaner that is not highly volatile.

Still yet another object of the present invention is to provide a cleaner that is simple and easy to handle and to store.

A further object of the present invention is to provide a cleaner that removes residues from a wide variety of materials.

Another object of the present invention is to provide a cleaner that can be used on a variety of outdoor equipment.

Yet another object of the present invention is to provide a cleaner that includes terpenes and/or terpenoids as cleaning agents.

Still another object of the present invention is to provide a cleaner that includes a thickener to form a viscosity cleaner.

Still yet another object of the present invention is to provide a cleaner that includes a surfactant to facilitate in the formation of a generally homogeneous and stable cleaner.

Another object of the present invention is to provide a cleaner that the cleaner includes ionic and/or non-ionic surfactants.

Yet another object of the present invention is to provide a cleaner that includes a biocide.

Still another object of the present invention is to provide a cleaner that includes a pH adjuster.

A further object of the present invention is to provide a cleaner that includes ammonia and/or amines and/or amides as supplementary cleaning agents.

Yet another object of the present invention is to provide a cleaner that includes an anti-oxidant, a corrosion resistor, and/or a biocide.

Still yet another object of the present invention is to provide a cleaner which includes a masking scent.

Another object of the present invention is to provide a cleaner which is combination of surfactants, non-petroleum based solvents and water.

Still another object of the present invention is to provide a gel type cleaner which clings to various metal surfaces and actively removes unwanted residue deposits such as plastic, carbon, lead, black powder that form when a firearm is discharged.

Still yet another object of the present invention is to provide a gel-type cleaner which is non-flammable, biodegradable, and has a pleasant aroma.

Yet another object of the present invention is to provide a cleaner which can be used with all types of metals and meets the most stringent volatile organic emission standards.

A further object of the present invention is to provide a cleaner which resists dripping, is non-flammable, contains no petroleum distillates, is biodegradable, contains no abrasives, and does not affect gun blueing.

These and other objects and advantages will become apparent to those skilled in the art upon the reading and following of this description.

DETAILED DESCRIPTION OF THE PREFERRED EMBODIMENTS

The invention has particular application to the sporting goods industry and in particular to firearms and related equipment and will be described with particular reference thereto; however, the invention has much broader applications and can be used to clean a variety of devices that develop carbon and metal residues upon use.

The improved cleaner is a viscous solution which includes a terpene/terpenoid cleaning agent. The terpene/terpenoid cleaning agent is selected to remove various types of residues from firearms. The cleaner is formulated to cling to the surface of a firearm component upon application and inhibit the migration of the cleaner to undesired areas on the firearm. The cleaner is preferably a liquid gel; however, the cleaner can be formulated to be a viscous aerosol. The cleaner is also preferably a water soluble solution. The viscosity of the cleaner is preferably about 2000–10,000 cp to achieve the desired clinging characteristics of the cleaner.

The terpene/terpenoid in the cleaner removes grease, oil, and various organic residues from the firearm, softens plastic residues in the firearm. The terpene/terpenoid is selected to have a low toxicity, and to form an emulsion in water. The terpene/terpenoid preferably forms a clear emulsion in water. The terpene/terpenoid content in the cleaner is preferably about 2–8%.

The cleaner also preferably includes a surfactant. The surfactant preferably is a combination of an ionic and non-ionic surfactant. The surfactant assists in emulsifying the terpenes/terpenoids in the cleaner and stabilizing the cleaner components. The surfactant assists in emulsifying dirt, grease, oil, gun powder, rust, corrosion and/or grime. The surfactant assists in wetting the surface of the firearm to allow the other components of the cleaner to perform their functions. The surfactant is preferably a ethoxyl alcohol surfactant and/or an ester surfactant. One preferred surfactant is a non-ionic surfactant of an ethoxylated alkyl phenol. A glycol, such as polyethylene glycol, is also preferably included in the cleaner. The cleaner also preferably includes an ionic/non-ionic surfactant. One preferred ionic/non-ionic surfactant includes modified alkanolamides. The total amount of surfactant included in the cleaner is preferably about 5–40%.

The cleaner is a water based cleaner and includes a substantial amount of water. The water functions as the carrier of the cleaner components. The water is a wetting agent to assist the other cleaner components to perform their respective functions. The water also functions as a cleaner and assists in removing residues such as gun powder, paint, dirt and grime. The cleaner includes about 50–95% water.

The general formulation of the cleaner, in weight percent, is as follows:

| | |
|---|---|
| Terpene/Terpenoid | 1–25% |
| Surfactant | 2–60% |
| Water | 30–95% |

A more specific formulation of the cleaner, in weight percent, is as follows:

| | |
|---|---|
| Terpene/Terpenoid | 2–15% |
| Non-ionic Surfactant | 1–30% |
| Ionic/Non-ionic Surfactant | 1–15% |
| Water | 55–80% |

The above cleaner formulation removes a wide variety of unwanted metal residues such as copper, lead, tombac, and zinc. The cleaner is also removes oil, grease, plastic, carbon and black powder. The cleaner has a viscosity that minimizes the migration of the cleaner after application. The cleaner is water soluble and biodegradable. The cleaner is essentially nonflammable and has a low toxicity. The cleaner includes essentially no abrasives or polishing agents which can damage a firearm. The cleaner includes essentially no petroleum distillates. The cleaner does not adversely affect the gun blueing during cleaning.

The cleaner may include one or more additives to enhance the properties of the cleaner. The cleaner can include dyes, anti-oxidants, corrosion inhibitors, lubricants, detergents, and/or biocides (i.e. anti-bacterial agents, fungicides). The additives, when added, constitute about 0.01–16% of the cleaner.

The cleaner can include an amine and/or amide to assist in the removal of certain residues. The amine and/or amide also inhibits rusting or corrosion during and/or after the cleaning of a metal component. The amide and/or amine also adjusts the pH of the cleaner to be a more alkaline cleaner. The amount of amine and/or amide in the cleaner is preferably about 0.4–15%.

The cleaner can also include ammonia and/or peroxide to assist in the removal of certain residues. The amount of ammonia and/or peroxide in the cleaner is preferably about 0.4–10%. Preferably, an amine and/or amide is added to the cleaner when ammonia and/or peroxide is included in the cleaner.

The cleaner may also include a scent agent to mask the natural odor of the components of the cleaner. The amount of scent agent in the cleaner is at least about 0.001%.

EXAMPLE 1

One specific formulation of the cleaner, in weight percent, is as follows:

| | |
|---|---|
| Terpene/Terpenoid | 2–15% |
| Non-ionic Surfactant | 3–30% |
| Ionic/Non-ionic Surfactant | 2–15% |
| Water | 55–80% |
| pH | 7–12 |
| Viscosity | 2000–15000 cp |

The cleaner is a liquid gel that removes residues such as plastics, gun powder, grease, oil, various organic residues, and various metal residues from a firearm. The cleaning gel is non-drip, non-flammable, low toxicity, low volatile, biodegradable and water soluble. The gel has pseudo plastic or thixotropic properties. The cleaning gel also is essentially absent petroleum distillates and abrasives and does not adversely affect firearm blueing. The cleaner has minimal migration after application. The terpene/terpenoid is selected to remove grease, oil, and various organic residues, and to soften plastic residues. The terpene/terpenoid is also selected to have a low toxicity. The terpene/terpenoid is preferably an extracted from a plant. Terpene/terpenoid is selected to form a clear emulsion in water. The surfactant assists in emulsifying dirt, grease, oil, gun powder, rust, corrosion and/or grime to assist in cleaning the firearm. The surfactant also assists in wetting the surface of the firearm to assist in the cleaning function of the other components of the cleaner. The surfactant is also selected to clarify the cleaner. The surfactant includes a non-ionic surfactant to emulsify dirt grease, oil, and grime, to act as a wetting agent, to assist in the removal of metal residues, and to increase the viscosity of the cleaner. One preferred non-ionic surfactant includes an ethoxyl alcohol and/or ester surfactant. The cleaner also includes an ionic/non-ionic surfactant. The ionic/non-ionic surfactant assists in the formation of clear or semi-clear cleaner. The ionic/non-ionic surfactant also improves the wetting, detergency and rinsing properties of the cleaner. Preferably, the ratio of ionic/non-ionic surfactant to terpenes/terpenoids is maintained to be about 0.5–1.5:1. One preferred ionic/non-ionic surfactant includes modified alkanolamides.

EXAMPLE 2

Another specific formulation of the cleaner, in weight percent, is as follows:

| | |
|---|---|
| Terpene/Terpenoid | 2–10% |
| Non-ionic Surfactant | 3–30% |
| Ionic/Non-ionic Surfactant | 2–15% |
| Corrosion Resistor | 0–20% |
| Biocide | 0–8% |
| Water | 55–80% |
| pH | 7–12 |
| Viscosity | 1000–10000 cp |

The properties of the cleaning gel are similar to those in Example 1. The corrosion inhibitor inhibits the cleaner from rusting or corroding a firearm during and/or after the cleaning process. Specifically, the corrosion inhibitor inhibits or prevents flash rusting or corrosion. Preferably, the corrosion inhibitor includes a surfactant that forms a thin protective layer on the surface of the firearm. On preferred corrosion inhibitor includes sodium benzoate. The rusting and corrosion inhibiting surfactant is a ester such as an anionic phosphate co-ester surfactant. The biocide inhibits or prevent micro-organisms from growing in the cleaner and fouling the components of the cleaner. The biocide preferably includes sodium benzoate, fungitrol 334, KATHON and/or NUOSEPT 101.

EXAMPLE 3

Another specific formulation of the cleaner, in weight percent, is as follows:

| | |
|---|---|
| Terpene/Terpenoid | 2–10% |
| Non-ionic Surfactant | 3–30% |
| Ionic/Non-ionic Surfactant | 2–15% |
| Corrosion Resistor | 0–20% |
| Biocide | 0–8% |
| Water | 55–80% |
| pH | 7–12 |
| Viscosity | 1500–9000 cp |

The properties of the cleaning gel are similar to those in Examples 1 and 2. The terpene/terpenoid includes D-LIMONENE and TERPENE EX, both commercially available products. D-LIMONENE and TERPENE EX remove grease, oil, organic residues, and soften plastic residues. The co-ester surfactant includes a phosphate ester surfactant. The phosphate surfactant inhibits flash rusting and corrosion, especially in water soluble cleaners. The modified alkanolamides emulsify the terpene/terpenoid in water to form a clear or semi-clear emulsion. The non-ionic surfactant includes an ethoxyl alcohol surfactant. The cleaner also preferably includes a glycol. One preferred surfactant includes octylphenoxy polyethoxy ethanol. The non-ionic surfactant emulsifies dirt, grease, oil and grime. The non-ionic surfactant assists in emulsifying the terpene/terpenoid in water to form a clear or semi-clear emulsion. The non-ionic surfactant also wets the metal surfaces of the firearm to enable the other components of the cleaner to function. The non-ionic surfactant also assists in gelling the cleaner.

EXAMPLE 4

Another specific formulation of the cleaner, in weight percent, is as follows:

| | |
|---|---|
| Terpene/Terpenoid | 4–10% |
| Non-ionic Surfactant | 3–30% |
| Ionic/Non-ionic Surfactant | 2–15% |
| Corrosion Resistor | 0–12% |
| Biocide | 0–4% |
| Scent agent | 0–0.1% |
| Water | 55–80% |
| pH | 7–12 |
| Viscosity | 2500–6000 cp |

The properties of the cleaning gel are similar to those in Examples 1, 2 and 3. The cleaner may include a scent agent to mask the components of the cleaner. The scent agent is derived from a natural source or can be artificially manufactured. The particular scent agent used is generally derived from the oil of a tree, plant, fruit or vegetable such as coconut, lemon or other citrus scents, earth, acorn, apple, pine, cedar, and corn. The use of a scented cleaner on a firearm assists in masking foreign scents from the wildlife.

EXAMPLE 5

Another specific formulation of the cleaner, in weight percent, is as follows:

| | |
|---|---|
| D-Limonene | 2–4% |
| TERPENE EX | 1–4% |
| Non-ionic | 6–12% |
| Ionic/Non-ionic Modified Alkanolamides | 4–6% |
| Phosphate Ester Surfactant | 0.1–0.8% |
| Sodium Benzoate | 0.1–0.7% |
| Kathon | 0.01–0.15% |
| Water | 70–80% |
| pH | 8–9 |
| Viscosity | 3000–5000 cp |

The properties of the cleaning gel are similar to those in Examples 1, 2, 3 and 4. The gel is clear and has a citrus odor.

EXAMPLE 6

Another specific formulation of the cleaner, in weight percent, is as follows:

| | |
|---|---|
| Terpene/Terpenoid | 4–10% |
| Non-ionic Surfactant | 3–30% |
| Ionic/Non-ionic Surfactant | 2–15% |
| Thickener | 0–10% |
| Amine and/or amide | 0.1–15% |
| Ammonia/Peroxide | 0.1–10% |
| Corrosion Resistor | 0–20% |
| Biocide | 0–8% |
| Scent agent | 0–0.1% |
| Water | 55–80% |
| pH | 9–12 |
| Viscosity | 2000–10000 cp |

The properties of the cleaning gel are similar to those in Examples 1, 2, 3 and 4. The thickener increases the viscosity of the cleaner. The thickeners preferably includes celluloses, alginates, acrylics, xanthan gums, gums, clays, silicas, polyacrylates, polyvinyl alcohol, starch, casein and/or stearates. The thickener is a nonflammable, biodegradable, water soluble and non-abrasive. Preferably, the thickener includes a water soluble modified acrylic. The modified acrylic thickener bodies up in alkaline cleaners. The amine assists in removing residues such as metal residues that include copper. The amine and/or amide also inhibits rusting or corrosion. The amine and/or amide adjusts the pH of the cleaner to be a more alkaline. The amine and/or amide preferably includes an amino alcohol such as 2 amino-2-methyl-1-propanol, triethanolamine and/or diethanolamine; and/or borates of mixed amines. The ammonia and/or peroxide is included in the cleaner to assist in the removal of certain residues such as, but not limited to, copper.

EXAMPLE 7

Another specific formulation of the cleaner, in weight percent, is as follows:

| | |
|---|---|
| D-LIMONENE | 2–4% |
| TERPENE EX | 2–4% |
| Non-ionic Ethoxylated Alkyl Phenol | 6–12% |

-continued

| | |
|---|---|
| Ionic/Non-ionic Modified Alkanolamides | 4–6.5% |
| Phosphate Ester Surfactant | 0.3–0.9% |
| Sodium Benzoate | 0–0.7% |
| KATHON | 0.05–0.2% |
| Morpholine | 4.5–7% |
| CARBOPOL | 0.8–1.5% |
| Ammonia | 1.5–3.5% |
| Water | 60–75% |
| pH | 9–11 |
| Viscosity | 4000–9500 cp |

The properties of the cleaning gel are similar to those in Examples 1, 2, 3, 4 and 6. The gel is white and has a neutral odor.

The cleaner is applied by any suitable means to the surface of a firearm or other metallic surface to be cleaned. Preferably, the cleaner is applied with a clean cloth or pad and is allowed to sit for a few seconds after which the surfaces of the firearm may be scrubbed with a brush. The cloth or pad is applied to the firearm to wet the surfaces of the firearm. The cloth or pad can be used to clean the outer and/or interior surfaces of the firearm. When the bore or barrel of the firearm is cleaned, the cleaner is applied to a brush and the brush is inserted in the bore or barrel. After scrubbing the firearm, it is rinsed or wiped clean to remove the cleaner and loosened any remaining residues.

The invention has been described with reference to a preferred embodiment and alternates thereof. It is believed that many modifications and alterations to the embodiments disclosed will readily suggest itself to the those skilled in the art upon reading and understanding the detailed description of the invention. It is intended to include all such modifications and alterations insofar as they come within the scope of the present invention.

We claim:

1. A viscous, substantially non-abrasive cleaner that removes organic and metal residues from hard surfaces upon application to the hard surface comprising a solvent suspended in a carrier having a sufficiently large viscosity to inhibit migration of said cleaner after application, said carrier including water and a surfactant, said solvent including an organic solvent, said organic solvent includes a cleaning agent selected from the group consisting of terpene, terpene derivatives, terpenoids, terpenoid derivatives, turpentine, turpentine derivatives, or mixtures thereof, said cleaner having a viscosity of at least about 1000 cp, said cleaning agent constituting at least about 2 percent of said cleaner, said surfactant present in an effective amount to emulsify said organic solvent.

2. A cleaner as defined in claim 1, wherein said cleaner is has a viscosity of about 1500–18000 cp.

3. A cleaner as defined in claim 2, wherein said cleaner has a viscosity of about 2000–18000 cp.

4. A cleaner as defined in claim 3, wherein said cleaner has a viscosity of about 2000–9500 cp.

5. A cleaner as defined in claim 1, wherein said cleaner is a gel.

6. A cleaner as defined in claim 1, wherein said cleaning agent content is about up to 25 percent.

7. A cleaner as defined in claim 6, wherein said cleaning agent content is about up to 8 percent.

8. A cleaner as defined in claim 1, wherein said organic solvent includes less than about 5 percent petroleum distillates.

9. A cleaner as defined in claim 8, wherein said organic solvent includes less than about 0.5 percent petroleum distillates.

10. A cleaner as defined in claim 1, wherein said cleaner is water soluble.

11. A cleaner as defined in claim 1, wherein said surfactant constituting over 2 percent of said cleaner.

12. A cleaner as defined in claim 11, wherein said surfactant constituting up to 60 percent of said cleaner.

13. A cleaner as defined in claim 12, wherein said surfactant constituting about 5–40 percent of said cleaner.

14. A cleaner as defined in claim 11, wherein said surfactant includes a non-ionic surfactant, said non-ionic surfactant including a compound selected from the group consisting of ethoxyl alcohol surfactant, ester surfactant, and combinations thereof.

15. A cleaner as defined in claim 11, including a surfactant having ionic and non-ionic compounds, said surfactant including alkanolamides, imidazolines, or mixtures thereof.

16. A cleaner as defined in claim 15, wherein said surfactant having ionic and non-ionic compounds constitutes about 1–15 percent of said cleaner.

17.A cleaner as defined in claim 16, wherein the ratio of said surfactant having ionic and non-ionic compounds to said organic solvent is about 0.5–2:1.

18. A cleaner as defined in claim 1, having an alkaline pH.

19. A cleaner as defined in claim 1, including an effective amount of corrosion inhibitor to inhibit flash rusting or corrosion of metal surfaces.

20. A cleaner as defined in claim 19, wherein said corrosion inhibitor content is at least about 0.1 percent of said cleaner.

21. A cleaner as defined in claim 20, wherein said corrosion inhibitor includes a phosphate ester surfactant, sodium benzoate, or mixtures thereof.

22. A cleaner as defined in claim 1, including a thickener, said thickener includes a water soluble, essentially non-abrasive compound selected from the group consisting of celluloses, alginates, acrylics, gums, silicas, polyacrylates, polyvinyl alcohol, starch, casein, stearates, and combinations thereof.

23. A cleaner as defined in claim 22, wherein said thickener content is about 0.1–10 percent of said cleaner.

24. cleaner as defined in claim 1, wherein said water content is about 30–95 percent of said cleaner.

25. A cleaner as defined in claim 24, wherein said water content is about 55–80 percent of said cleaner.

26. A cleaner as defined in claim 1, including an effective amount of a biocide to inhibit micro-organism growth in said cleaner.

27. A cleaner as defined in claim 26, wherein said biocide includes sodium benzoate, isothiazolone, or mixtures thereof.

28. A cleaner as defined in claim 26, wherein said biocide content is about 0.05–8 percent of said cleaner.

29. A cleaner as defined in claim 1, including second cleaning agent, said second cleaning agent includes a compound selected from the group consisting of alkanolamines, amino alcohols, borates of amines, and mixtures thereof.

30. A cleaner as defined in claim 29, wherein said second cleaning agent content is about 0.4–15 percent of said cleaner.

31. A cleaner as defined in claim 1, including a basic residue remover comprising of ammonia, ammonia compounds, peroxide, peroxide compounds, or mixtures thereof.

32. A cleaner as defined in claim 31, wherein said residue remover content is about 0.4–10 percent of said cleaner.

33. A cleaner as defined in claim 1, including an effective amount of a scent agent to at least partially mask the odor of said organic solvent and said carrier.

34. A cleaner as defined in claim 33, wherein said scent agent content is at least about 0.005 percent of said cleaner.

35. A cleaner as defined in claim 1, wherein said hard surfaces are firearm surfaces.

36. A cleaner as defined in claim 1, including:

| | |
|---|---|
| Terpene/Terpenoid | 2–25% |
| Surfactant | 2–60% |
| Thickener | 0.1–10% |
| Corrosion Resistor | 0–20% |
| Biocide | 0–8% |
| Amine and/or amide | 0–15% |
| Residue remover | 0–10% |
| Water | 30–95% |
| Viscosity | 2000–9000 cp |
| pH | >7. |

37. A cleaner as defined in claim 36, including:

| | |
|---|---|
| Terpene/Terpenoid | 2–15% |
| Surfactant | 2–40% |
| Thickener | 0.1–10% |
| Corrosion Resistor | 0–20% |
| Biocide | 0–8% |
| Amine and/or amide | 0–15% |
| Residue remover | 0–10% |
| Water | 30–95% |
| Viscosity | 2000–9000 cp |
| pH | >7. |

38. A cleaner as defined in claim 37, including:

| | |
|---|---|
| Terpene/Terpenoid | 2–15% |
| Non-ionic Ethoxylated Alkyl Phenol | 5–40% |
| Phosphate Ester Surfactant | at least 0.3% |
| Biocide | 0–8% |
| Amine and/or amide | 0–15% |
| Residue remover | 0–10% |
| Water | 50–95% |
| Viscosity | 2000–9000 cp |
| pH | >7. |

39. A viscous, substantially non-abrasive, cleaner for direct application onto firearms that at least partially removes organic and metal residues from the firearm surfaces without scratching the firearm surface or removing the bluing from the firearm surface comprising a solvent suspended in a carrier having a sufficiently large viscosity to inhibit migration of said cleaner after application, said carrier including water, surfactant, a majority of said solvent being an organic solvent, said organic solvent includes a cleaning agent selected from the group consisting of terpene, terpene derivatives, terpenoids, terpenoid derivatives, and mixtures thereof, said cleaner having a viscosity of at least about 1000 cp.

40. A cleaner as defined in claim 39, wherein said cleaner has a viscosity of about 2000–9500 cp.

41. A cleaner as defined in claim 39, including less than about 5 percent petroleum distillates.

42. A cleaner as defined in claim 39, wherein said cleaner is a water soluble, alkaline, gelled cleaner.

43. A cleaner as defined in claim 39, wherein said cleaning agent content constituting at least about 2 percent of said cleaner.

44. A cleaner as defined in claim 39, wherein said cleaning agent content is about 2–25 percent.

45. A cleaner as defined in claim 39, wherein said surfactant content constituting at least about 5 percent of said cleaner.

46. A cleaner as defined in claim 39, wherein said surfactant content constituting about 5–40 percent of said cleaner.

47. A cleaner as defined in claim 39, wherein said surfactant includes a non-ionic surfactant, said non-ionic surfactant comprising ethoxyl alcohol surfactant, ester surfactant, or mixtures thereof.

48. A cleaner as defined in claim 39, including a surfactant having ionic and non-ionic compounds, said surfactant having ionic and non-ionic compounds comprising alkanolamides, imidazolines, or mixtures thereof, said surfactant content constituting about 1–15 percent of said cleaner and a ratio of said complex to said organic solvent of about 0.5–2:1.

49. A cleaner as defined in claim 39, including a thickener to at partially increase the viscosity of said cleaner.

50. A cleaner as defined in claim 39, including a water soluble, alkaline active, essentially non-abrasive thickening agent comprising celluloses, alginates, acrylics, gums, silicas, polyacrylates, polyvinyl alcohol, starch, casein, stearates, or mixtures thereof, said thickener content is about 0.1–10 percent of said cleaner.

51. A cleaner as defined in claim 39, including an effective amount of corrosion inhibitor to inhibit flash rusting or corrosion of metal surfaces, said corrosion inhibitor content is at least about 0.1 percent of said cleaner, said corrosion inhibitor comprising a phosphate ester surfactant, sodium benzoate, or mixtures thereof.

52. A cleaner as defined in claim 39, including an effective amount of a biocide to inhibit micro-organism growth in said cleaner, said biocide comprising sodium benzoate, isothiazolone, or mixtures thereof, said biocide content is about 0.05–8 percent of said cleaner.

53. A cleaner as defined in claim 39, including second cleaning agent comprising alkanolamines, amino alcohols, borates of amines, or mixtures thereof, said ammonia derivative cleaning agent content is about 0.4–15 percent of said cleaner.

54. A cleaner as defined in claim 39, including a basic residue remover comprising of ammonia, ammonia compounds, peroxide, peroxide compounds, or mixtures thereof, said basic residue remover content is about 0.4–10 percent of said cleaner.

55. A cleaner as defined in claim 39, wherein said water constituting at least about 50 percent of said cleaner.

56. A cleaner as defined in claim 39, including:

| | |
|---|---|
| Terpene/Terpenoid | 2–25% |
| Surfactant | 5–60% |
| Thickener | 0.1–10% |
| Corrosion Resistor | 0–20% |
| Biocide | 0–8% |
| Amine and/or amide | 0–15% |
| Residue remover | 0–10% |
| Water | 50–95% |
| Viscosity | 2000–9000 cp |
| pH | >7. |

57. A cleaner as defined in claim 56, including:

| | |
|---|---|
| Terpene/Terpenoid | 2–15% |
| Non-ionic Ethoxylated Alkyl Phenol | 5–40% |
| Phosphate Ester Surfactant | at least 0.3% |
| Biocide | 0–8% |
| Amine and/or amide | 0–15% |
| Residue remover | 0–10% |
| Water | 50–95% |
| Viscosity | 2000–9000 cp |
| pH | >7. |

58. A cleaner as defined in claim 39, including an effective amount of a scent agent to at least partially mask the odor of said organic solvent and said carrier.

59. A cleaner as defined in claim 58, wherein said scent agent content is at least about 0.005 percent of said cleaner.

60. A cleaner as defined in claim 59, said scent agent including a scent selected from the group consisting of earth, acorn, apple, pine, cedar, corn, and combinations thereof.

61. A cleaner as defined in claim 39, including:

| | |
|---|---|
| Terpene/Terpenoid | 2–25% |
| Surfactant | 5–60% |
| Thickener | 0–10% |
| Corrosion Resistor | 0–20% |
| Biocide | 0–8% |
| Amine and/or amide | 0–15% |
| Residue remover | 0–10% |
| Scent agent | 0–1% |
| Petroleum Distillates | 0–2% |
| Water | 30–95% |
| Viscosity | 2000–18000 cp |
| pH | >7. |

62. A cleaner as defined in claim 61, including:

| | |
|---|---|
| Terpene/Terpenoid | 2–15% |
| Surfactant | 2–40% |
| Thickener | 0–10% |
| Corrosion Resistor | 0–20% |
| Biocide | 0–8% |
| Amine and/or amide | 0–15% |
| Residue remover | 0–10% |
| Petroleum Distillates | 0–2% |
| Scent Agent | 0–1% |
| Water | 30–95% |
| Viscosity | 2000–9000 cp |
| pH | >7. |

63. A cleaner as defined in claim 62, including:

| | |
|---|---|
| Terpene/Terpenoid | 2–15% |
| First Surfactant | 2–30% |
| Second Surfactant | 2–15% |
| Thickener | 0–10% |
| Corrosion Resistor | 0–20% |
| Biocide | 0–8% |
| Amine and/or amide | 0–15% |
| Residue remover | 0–10% |
| Petroleum distillates | 0–2% |
| Scent Agent | 0–1% |
| Water | 50–95% |
| Viscosity | 2000–9000 cp |
| pH | >7. |

64. A cleaner as defined in claim 63, including:

| | |
|---|---|
| Terpene/Terpenoid | 2–15% |
| Non-ionic Ethoxylated Alkyl Phenol | 5–40% |
| Phosphate Ester Surfactant | at least 0.3% |
| Biocide | 0–8% |
| Amine and/or amide | 0–15% |
| Residue remover | 0–10% |
| Petroleum Distillates | 0–2% |
| Scent Agent | 0–1% |
| Water | 50–95% |
| Viscosity | 2000–9000 cp |
| pH | >7. |

65. A cleaner as defined in claim 63, including:

| | |
|---|---|
| Terpenel Terpenoid | 2–15% |
| First Surfactant | 3–30% |
| Second Surfactant | 2–15% |
| Corrosion Resistor | 0–20% |
| Thickener | 0–10% |
| Biocide | 0–8% |
| Amine and/or amide | 0–15% |
| Residue remover | 0–10% |
| Petroleum distillates | 0–2% |
| Seent agent | 0–1% |
| Water | 75–95% |
| Viscosity | 2000–9000 cp |
| pH | >7. |

said first surfactant includes a compound selected from the group consisting of ethoxylated alkyl phenol, ethoxylated alcohols, glycol esters and mixtures thereof, said second surfactant includes a compound selected from the group consisting of alkanolamides, imidazolines and mixtures thereof, said second surfactant having a weight ratio to said cleaning agent of about 0.5:1 to 2:1.

66. A cleaner as defined in claim 65, including:

| | |
|---|---|
| Terpene/Terpenoid | 2–15% |
| First Surfactant | 3–30% |
| Second Surfactant | 2–15% |
| Corrosion Resistor | 0.1–20% |
| Thickener | 0.1–10% |
| Biocide | 0.05–8% |
| Amine and/or amide | 0.4–15% |
| Residue remover | 0.4–10% |
| Petroleum distillates | 0–2% |
| Scent agent | 0–1% |
| Water | 50–95% |
| Viscosity | 2000–9000 cp |
| pH | >7 |

said cleaning agent being non-flammable, said cleaning agent includes D-limonene, said first surfactant includes an ethoxylated alkyl phenol, said second surfactant includes an alkanolamide, said thickener includes acrylic thickener.

67. A cleaner as defined in claim 66, including:

| | |
|---|---|
| Terpene/Terpenoid | 2–15% |
| First Surfactant | 3–30% |
| Second Surfactant | 2–15% |
| Corrosion Resistor | 0.1–20% |
| Thickener | 0–1% |
| Biocide | 0.05–8% |
| Amine and/or amide | 0–15% |
| Residue remover | 0–10% |
| Petroleum distillates | 0–2% |
| Scent agent | 0–1% |
| Water | 75–95% |
| Viscosity | 2000–9000 cp |
| pH | >7 |

said cleaning agent being non-flammable, said cleaning includes D-limonene, said first surfactant includes an ethoxylated alkyl phenol, said second surfactant includes an alkanolamide.

* * * * *